United States Patent
Lilliston, III et al.

(10) Patent No.: US 11,091,355 B1
(45) Date of Patent: Aug. 17, 2021

(54) MECHANICALLY INTELLIGENT END-OF-ARM TOOL

(71) Applicant: Amazon Technologies, Inc., Seattle, WA (US)

(72) Inventors: Leonard Thomas Lilliston, III, North Reading, MA (US); Beth A. Marcus, North Reading, MA (US)

(73) Assignee: Amazon Technologies, Inc., Seattle, WA (US)

( * ) Notice: Subject to any disclaimer, the term of this patent is extended or adjusted under 35 U.S.C. 154(b) by 447 days.

(21) Appl. No.: 15/981,672

(22) Filed: May 16, 2018

(51) Int. Cl.
*B66C 1/00* (2006.01)
*B25B 11/00* (2006.01)
*B23Q 3/08* (2006.01)
*B25J 15/06* (2006.01)

(52) U.S. Cl.
CPC ............... *B66C 1/00* (2013.01); *B23Q 3/088* (2013.01); *B25B 11/005* (2013.01); *B25J 15/06* (2013.01); *B25J 15/0616* (2013.01); *B25J 15/0641* (2013.01); *B25J 15/0683* (2013.01)

(58) Field of Classification Search
CPC ... B25B 11/005; B23Q 3/088; B23Q 2703/04; B65G 47/91; B65G 47/911; B66C 1/00; B66C 1/02; B66C 1/0218; B66C 1/0231; B66C 1/0256

USPC ....................................................... 269/20, 21
See application file for complete search history.

(56) References Cited

U.S. PATENT DOCUMENTS 5,344,202 A * 9/1994 Ramler ................ B25J 15/0616
294/188

FOREIGN PATENT DOCUMENTS

DE 3228040 C1 * 3/1984 ............. B65G 47/91

OTHER PUBLICATIONS

DE 3228040 Machine Translation (Year: 1984).*

* cited by examiner

*Primary Examiner* — Lee D Wilson
*Assistant Examiner* — Alberto Saenz
(74) *Attorney, Agent, or Firm* — BakerHostetler

(57) ABSTRACT

A mechanically intelligent end-of-arm tool includes a valve that is actuated by the action of the arm, such that a force applied to the object to be grasped opens the valve to expose a suction cup to the vacuum pressure. A spool valve, poppet valve, and butterfly valve, et al., can perform the valve function. The tool may include a button that has a rigid contact surface or may be deformable to provide a smoothing force to the object.

20 Claims, 8 Drawing Sheets

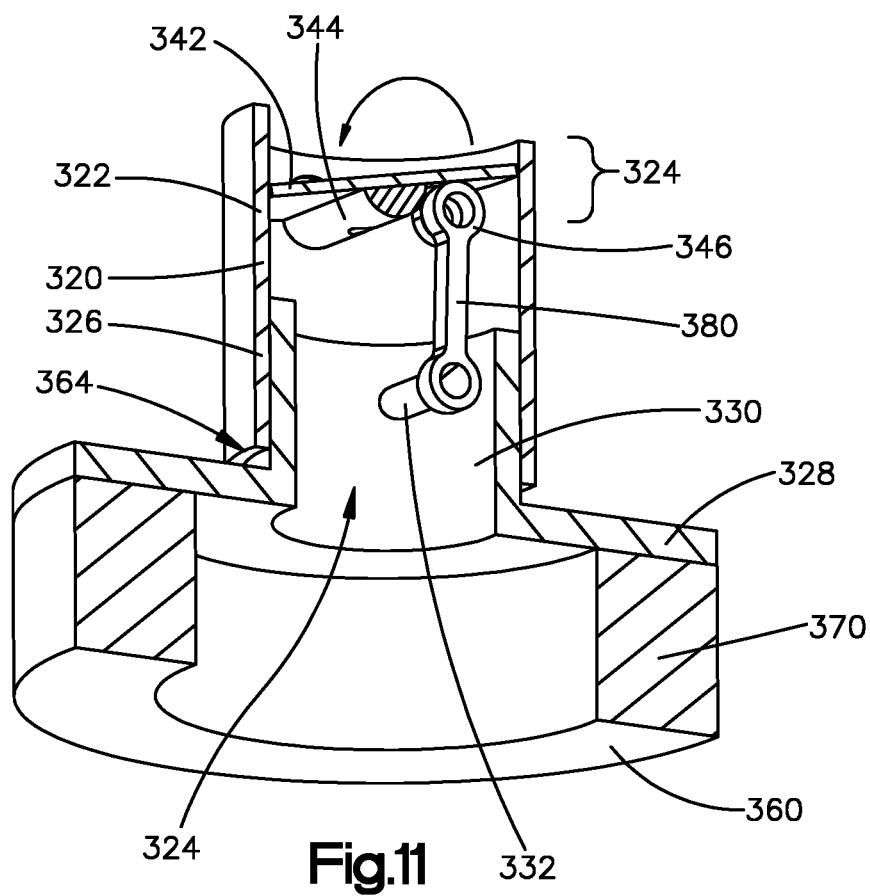
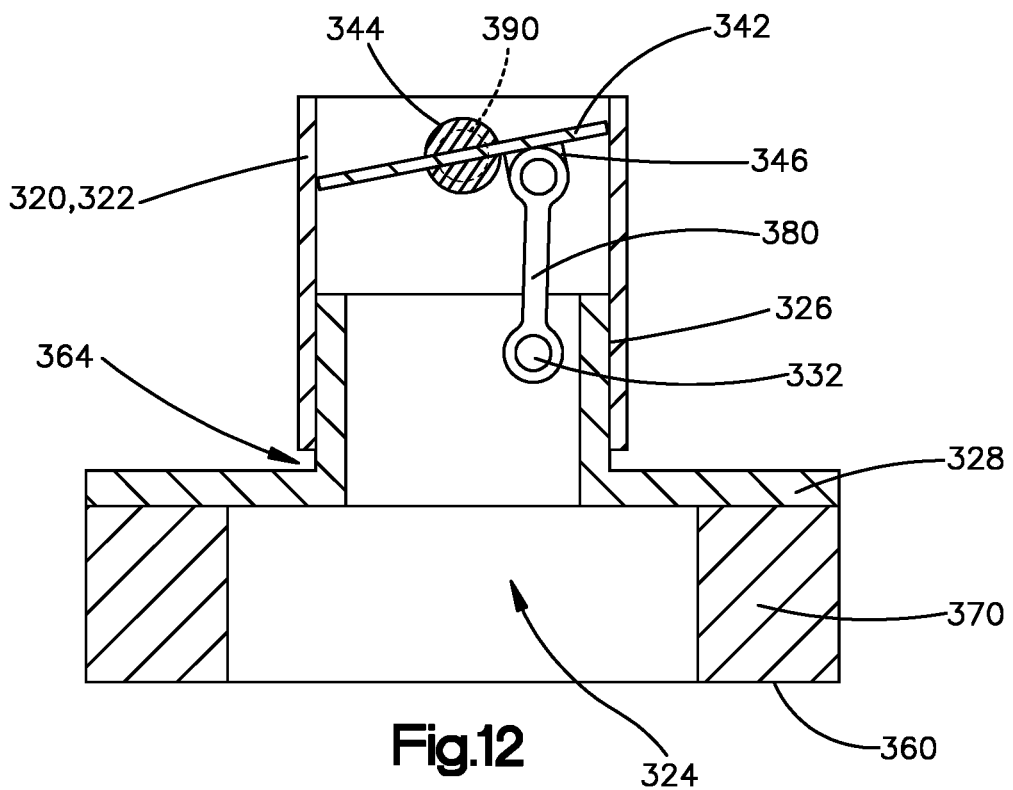

MECHANICALLY INTELLIGENT END-OF-ARM TOOL

BACKGROUND

The present invention relates to automation, and more particularly to mechanically intelligent tools for engaging and lifting items via vacuum.

The robotics field has developed many tools for engaging and lifting items using end effectors. For example, end effectors sometimes employ suction cups for engaging a surface of an item and using a negative or suction pressure or vacuum to grasp the item.

Conventional suction cups on robotic end-of-arm tools have some limitations. For example, in a fulfillment center or like facility handling a great quantity of packages or objects per day, lack of adequate control over instrumentation can sometimes slow down movement efficiency. Also, for items that are covered by a loose, flexible film, engagement by a suction cup can deform the film and separate it from the item.

Mechanical intelligence, in general, addresses some drawbacks relating to instrumentation and controls of robotic tools. The terms "mechanical intelligence" and "mechanically intelligent," as used herein, refer to functions of a mechanical system or device that are triggered and at least partially actuated by motions of the system or device that are inherent to the desired task. For example, a mechanically intelligent device might not have both an electronic sensor that initiates a function and an externally powered actuator for performing the function.

BRIEF DESCRIPTION OF THE DRAWINGS

FIG. 11 is a perspective cross-sectional view of the butterfly valve of FIG. 10;

FIG. 12 is a side view of the butterfly valve of FIG. 11;

DETAILED DESCRIPTION OF ILLUSTRATIVE EMBODIMENTS

Figure 1:
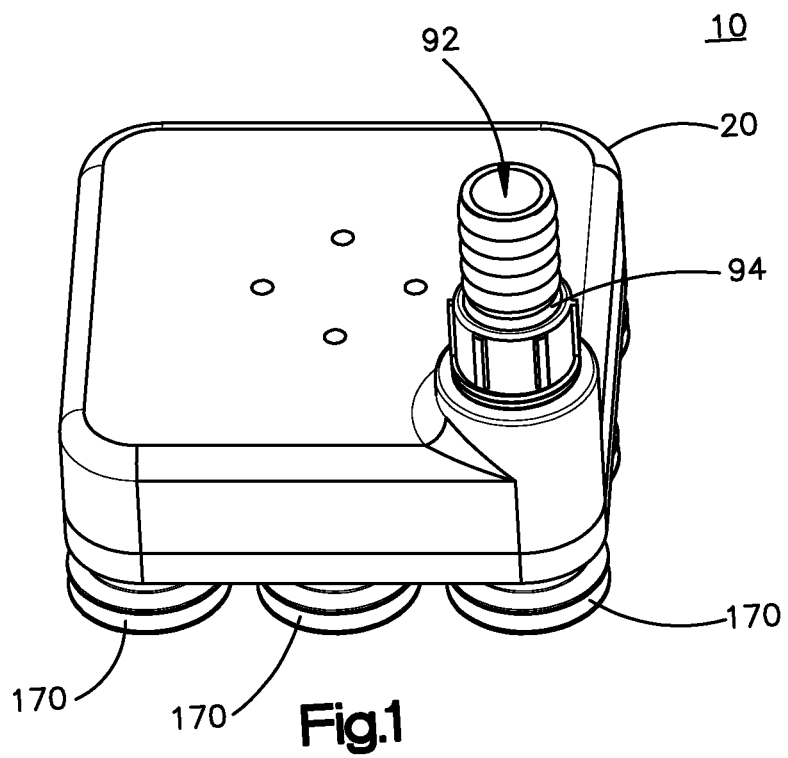
FIG. 1 is a top perspective view of an end-of-arm tool illustrating aspects of the present invention.
Figure 2:
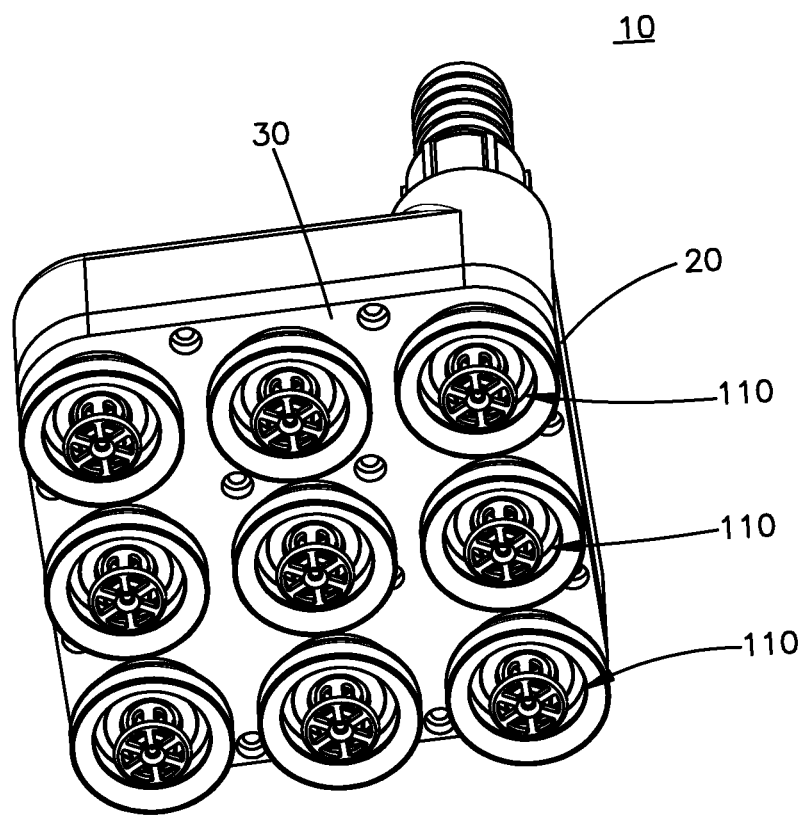
FIG. 2 is a bottom perspective view of the end-of-arm of FIG. 1.
Figure 3:
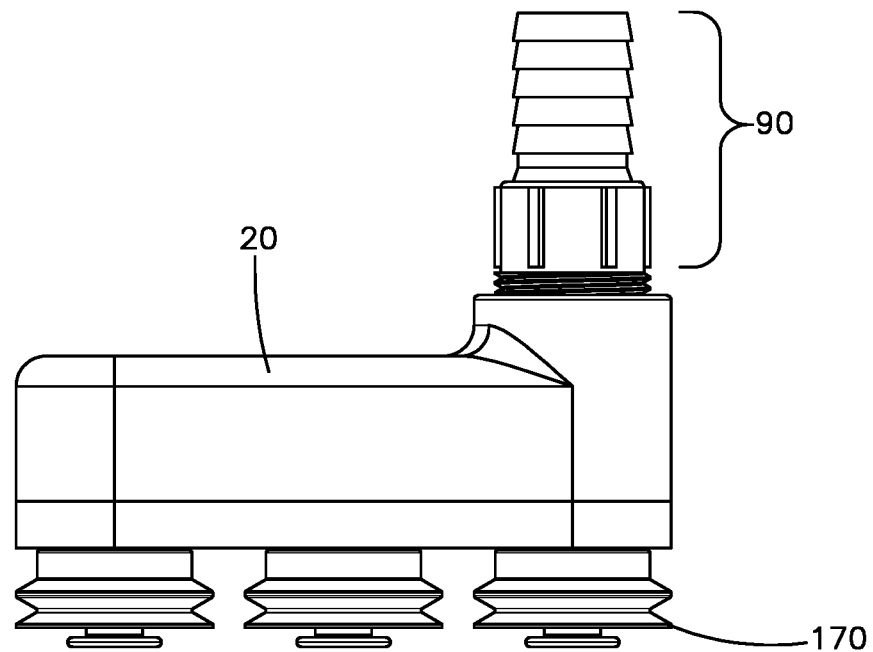
FIG. 3 is a side view of the end-of-arm of FIG. 1.
Figure 4:
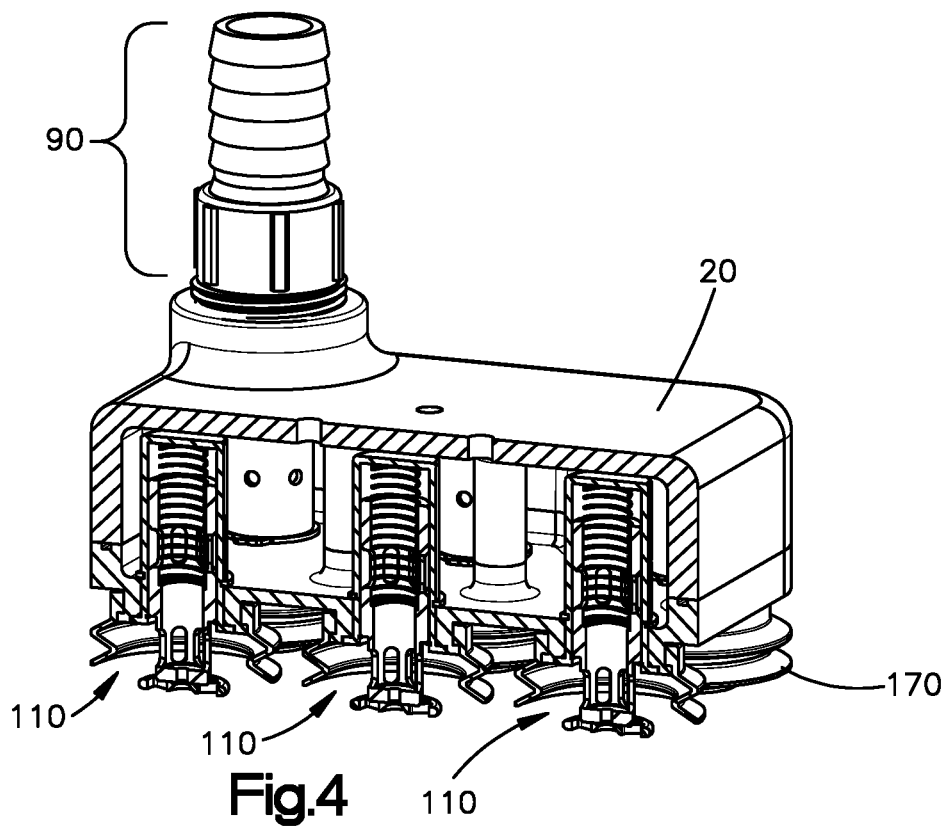
FIG. 4 is a perspective cross-sectional view of the end-of-arm tool of FIG. 1 illustrating a spool valve in cross section.
Figure 5:
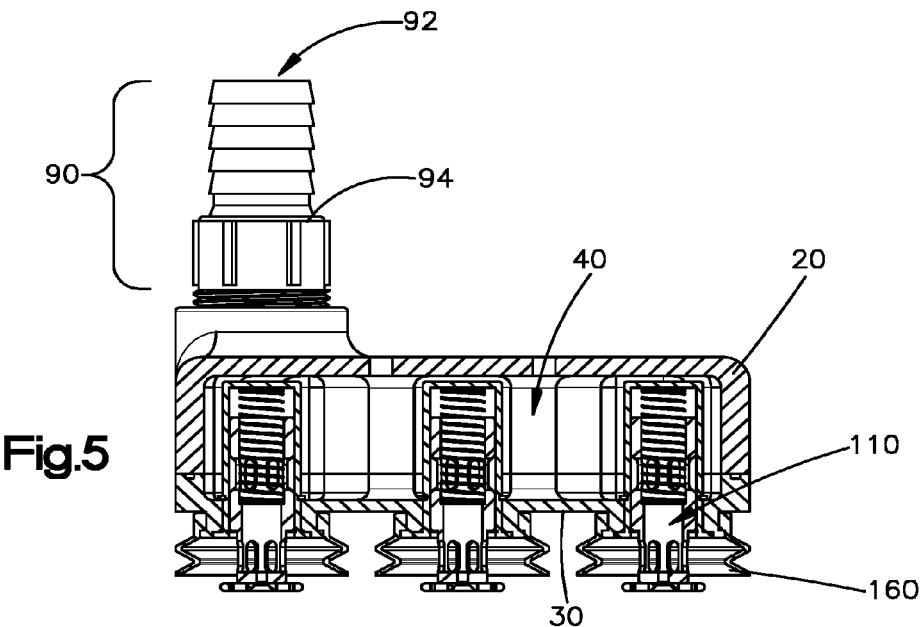
FIG. 5 is a side view of the end-of-arm tool shown in FIG. 1.
Figure 6:
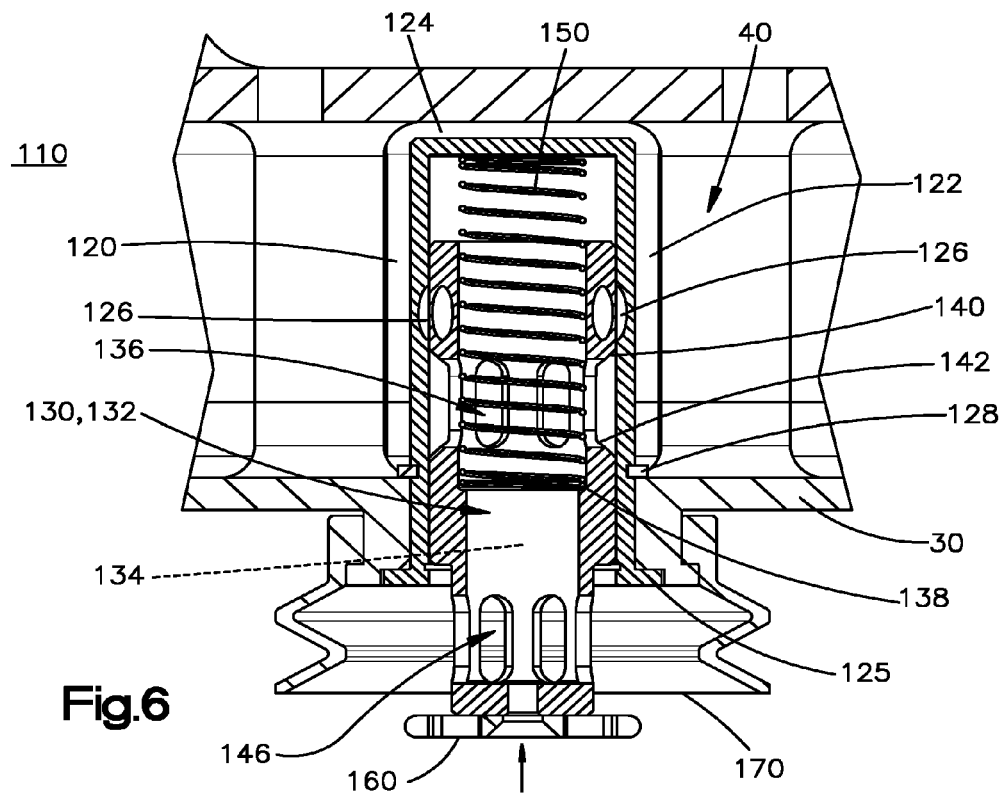
FIG. 6 is an enlarged portion of FIG. 5 illustrating the spool valve in cross section.

The end-of-arm tools illustrated herein can be for mechanically intelligent use on a robot or other automated system, preferably in a facility in which packages are grasped using suction. In some fulfillment centers or like facilities, the process of applying a label on a corrugate box or other object sometimes imperfectly adheres the label to the substrate. For example, some adhesive labels are applied to boxes or other items by a system that often lightly applies the label to a box, item, or other substrate using positive air pressure. Later, engagement of the box or item by an automated suction cup tool can grasp only the label, inadvertently pulling the label from the box or item, which separates the identifying information from the box or item causing downstream processing errors. The structure described herein, in one aspect, addresses the problem of inadvertent removal of labels by suction cups and like tools.

For example, for packages (such as corrugate boxes) having a label, the inventive end-of-arm tools disclosed herein includes features that apply a force to the label before the suction cup(s) of the tool fully engage the box surface and/or before the box/label encounters vacuum pressure. As described more fully below, the mechanically intelligent tool applies a downward, contact force to the label, and in some embodiments applies a partially outwardly-oriented radial force on the label, to enhance the contact between the label and the corrugate or other substrate. Moreover, the tool, in some embodiments, initiates contact with an item before or near in time to applying vacuum to the suction cup, which is beneficial, for example, in avoiding unintentionally picking an adjacent item to the target item. Controlling the vacuum (such as on and off) by mechanical intelligence as described herein also avoids inadvertently picking a light item in addition to or instead of the target item on the way to picking the item and after releasing the item. The term "before applying vacuum" encompasses changing from a zero or near-zero vacuum to full vacuum pressure, and also changing the magnitude of the pressure.

Applying the contact force is especially useful in circumstances in which the force of initial application on the label is small, or the adhesive might require additional curing time, or other factors that might interfere with the adherence of the label. The contact force is also believed to be a benefit when grasping an item that is covered with a film. Moreover, the preferred embodiments are mechanically intelligent such that no instrumentation or separate actuator (that is, other than those of the arm that positions and moves the tools described herein) is required to apply the vacuum pressure to the suction cup. In this regard, the force that creates the contact force is from an arm moving the assembly into engagement with an object.

Three embodiments of valve are disclosed herein. An end-of-arm tool 10 illustrated in FIGS. 1-6 employs a first embodiment spool valve assembly 110. Additional embodiments, a poppet valve 210 and a butterfly valve 310, are also described and can be implemented into the tool in place of the spool valve assembly. The valves preferably have a means for biasing them to the closed position, such as a spring, to interrupt or diminish vacuum pressure supplied to the suction cup. The present invention is not limited to valves having a biasing means or to a particular structure of the biasing means unless set out in the claims.

End-of-arm tool 10 includes a housing 20 and an adapter 90 that forms a vacuum inlet 92 and a connection 94 to a robotic arm. The terms "arm" and "end-of-arm" as used herein refer to the distal or working end of any kind of end effector, including without limitation a robotic arm; a gantry; a hand-held tool at the end of (for example) a bungee and manipulated by a human; and any other configuration capable of positioning the suction cup tool. Thus, reference number 92 is employed to broadly refer to any structure and function.

Housing 20 is an enclosure that includes a base plate 30 that includes apertures through which the valves, such as spool valve 110, are mounted. Housing 20 includes a plenum 40 that is connected to a vacuum source (not shown in the figures) through opening 92 such that plenum 40 is under negative pressure under normal operation of tool 10. Tool 10 is illustrated having an array of nine suction cups and valves, and the present invention is not limited to any number or arrangement of valves and suction cups per each tool. For example, the present invention encompasses a housing around only one valve and suction cup, such that the tool has only one suction cup. The valves and suction cups may also be configured in different patterns, such as concentrically. As explained more fully below, in some circumstances the vacuum in the plenum 40 is eliminated in order to release the grasp of the item on the suction cups, and then enable the valve to close without an external actuator.

Spool valve 110 is affixed to base plate 30 by any appropriate mechanical means, as will be understood by persons familiar with suction cup tools. Spool valve 110 in a rest position blocks air flow through the valve, and in an engaged or actuated position permits air flow or air to be drawn through the valve and into the negative pressure plenum. The term "air flow" is used broadly herein to refer to moving air and also to the transmission of pressure. For example, in circumstances in which the valve is in its actuated (open) position, the valve can permit air flow if the suction cup is spaced apart from the item to be grasped; and the term "air flow" is intended to apply even if the suction cup effectively blocks the movement of air, as the negative pressure of the plenum is transmitted to the suction cup and the item to be grasped.

Spool valve 110 includes a cover or housing 120, a piston assembly 130, and a suction cup 170. Valve housing 120 is located within tool housing 20 such that an outboard surface of valve housing 120 is in contact with the negative pressure of plenum 40. Housing 120 includes a (preferably circumferential) sidewall 122 that is joined to a top plate 124 and a bottom plate 125 that includes a seal 128 that acts against the outer surface of the piston. Sidewall 122 includes through apertures 126 that preferably are spaced circumferentially around sidewall 122. In some embodiments, valve bottom plate 125 is affixed to housing base 30 via mechanical means, such as fasteners (screws, nuts and bolts, spring clips, detents, and the like) or screw threads, or the like.

Piston assembly 130 is located partially within housing 120 and extends through base plate 30. Piston assembly 130 includes a piston shaft defined by a piston shaft wall 132 that is hollow to form a longitudinal internal passage 134 therethrough. Shaft wall 132 includes through ports 136. Piston wall 132 also includes a shoulder 138 that functions as a stop.

An upper seal 140 is located on the outboard surface of shaft wall 132 above ports 136 and a lower seal 142 is located on the outboard surface of shaft wall 132 below ports 136. Seals 140 and 142 extend circumferentially about and radially outwardly from shaft wall 132, and the seals contact an inboard surface of housing sidewall 122. In this regard, a portion of the piston shaft wall 132 and seals 140 and 142 form a spool. Thus, in the rest position of FIGS. 1-6, the sealing contact isolates or blocks air flow (which as explained above, also isolates or blocks pressure transmission or communication). The term "block" applies to inhibition of air flow, even if the seal is imperfect.

A spring 150, preferably a coil or helical spring, biases the spool toward its closed position, as illustrated in the figures. Spring 150 in the embodiment shown is located inside of shaft wall 132 and is compressed between the inside surface or underside of top wall 124 of housing 120 and the upper side of shoulder 138. Thus, spring 150 biases in the rest position shown, for example, in FIG. 6. Spring 150 can have a uniform force over its range (that is, spring 150 can create a constant spring force regardless of its magnitude of compression). Alternatively, depending on the desired characteristics of the tool, a spring or combination of springs may be employed that creates a force output that is not uniform over its magnitude of compression range. In this regard, the spring force can be tuned according to the desired parameter of the tool. The term "force profile" is used to refer to the force of the spring as a function of the suction cup position or magnitude of spring compression. Further, in embodiments of tools having multiple suction cups, such as in an array, the spring force or force provide can be individually and separately optimized for each valve, thereby providing additional functionality, as desired.

A lower portion of shaft wall 132 includes openings 146 that are inlets for air flow while the valve is open and air flows from ambient toward the plenum 40. The lowermost end of the valve shaft wall 132 includes a button 160, which has a lower face that is engineered to contact, and apply a contact force to, a label, film, or other surface. Button 160 is illustrated as having a planar, circular shape. Other configurations are contemplated, depending on the particular parameters and goals of the tool.

A suction cup 170 is coupled to the lower end of the valve, and may alternatively be attached to base plate 30 around the valve. Suction cup 170 is illustrated as a bellows, and the invention encompasses a vacuum cup and any other structure, as will be understood by persons familiar with end effectors employing vacuum. Thus, the term "suction cup" is used broadly throughout the specification and claims to refer to any structure capable of applying a vacuum force to an object.

Figure 7:
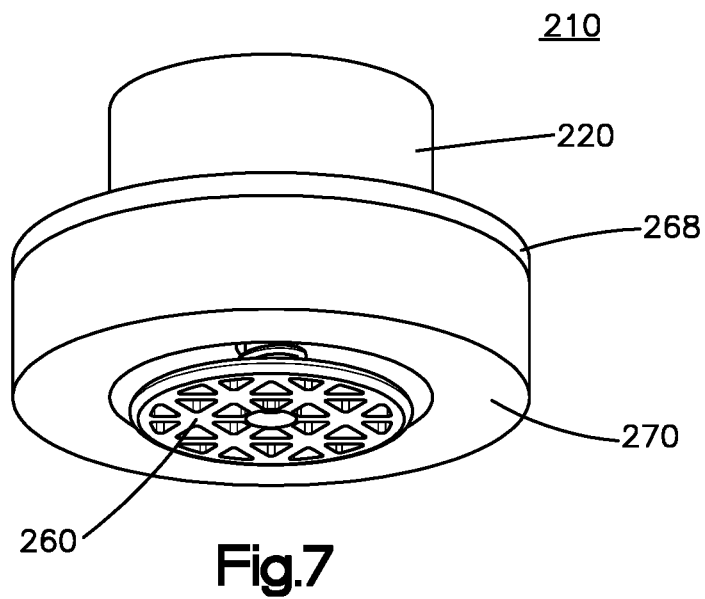
FIG. 7 is a top perspective view of a poppet valve alternative to the spool valve shown in FIG. 6.
Figure 8:
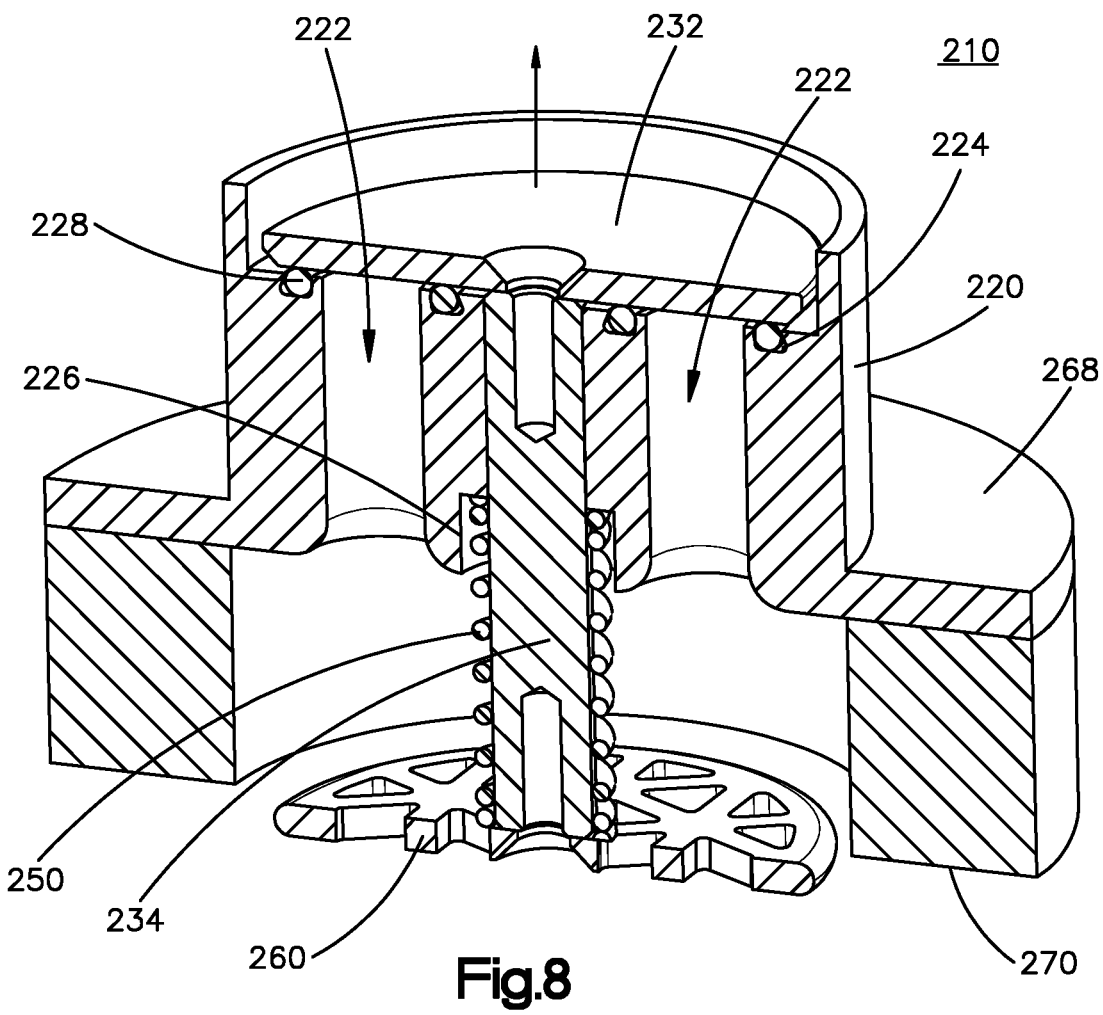
FIG. 8 is a perspective cross-sectional view of the poppet valve of FIG. 7.
Figure 9:
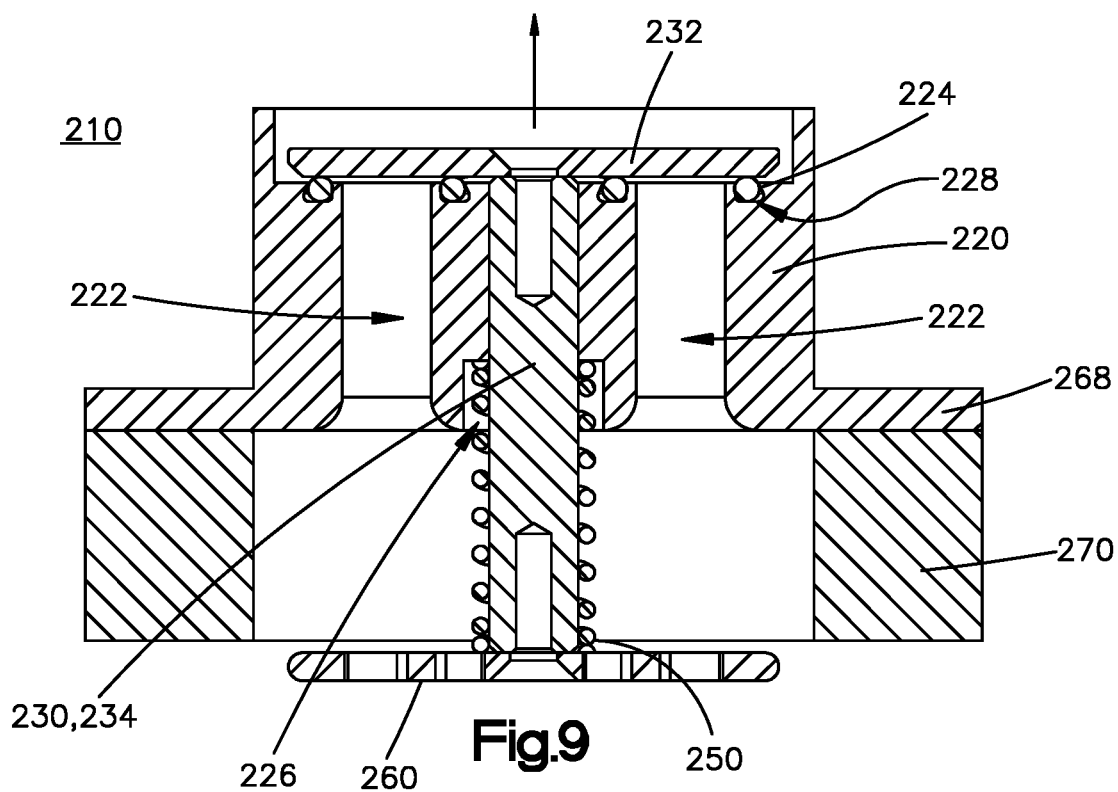
FIG. 9 is a side view of the poppet valve of FIG. 8.

FIGS. 7-9 illustrate a second embodiment valve assembly, a poppet valve 210, that may be used in place of the spool valve assembly 110 described above. Poppet valve 210 includes a poppet valve housing 220, a poppet body 230, and a suction cup 270. Housing 220 may be affixed to housing base 30 by any appropriate means, as will be understood by persons familiar with suction cup technology. Poppet valve housing 220 includes longitudinal passages 222. Seals 224 are located at the upper ends of each passage 222. In the embodiment of the figures, seals 224 are o-rings that reside in an annular recess 228 about the opening to each passage 222. Other seal types and locations are contemplated. Housing 220 also includes a downwardly facing recess 226 for retaining a spring 250, as explained below.

Poppet body 230 includes a seal plate 232, a poppet shaft 234, and a button 260. Seal plate 232 has an underside that engages seals 224 when in the rest position shown in the figures. Shaft 234 is affixed to seal plate 232 and extends downwardly through body 230. Button 260 is affixed to the distal or lowermost end of shaft 234; and button 260 may be configured as described for first embodiment button 160.

Spring 250 is compressed between recess 226 in housing 220 and button 260 such that spring 250 biases the valve closed. In this regard, spring 250 applies a downward, contact force on button 260, which force is transmitted through shaft 234 to seal plate 232 to force or urge plate 232 into contact with seals 224. Because the outboard or upper surface of seal plate 232 is in contact with the negative pressure in plenum 40, the sealing contact between seals 224 and plate 232 blocks or inhibit air flow through the valve, defining the closed or rest position of valve assembly 210.

Suction cup 270 is shown in the figures as a vacuum cup that is coupled to a flange 268 of housing 220. Other configurations are contemplated.

Figure 10:
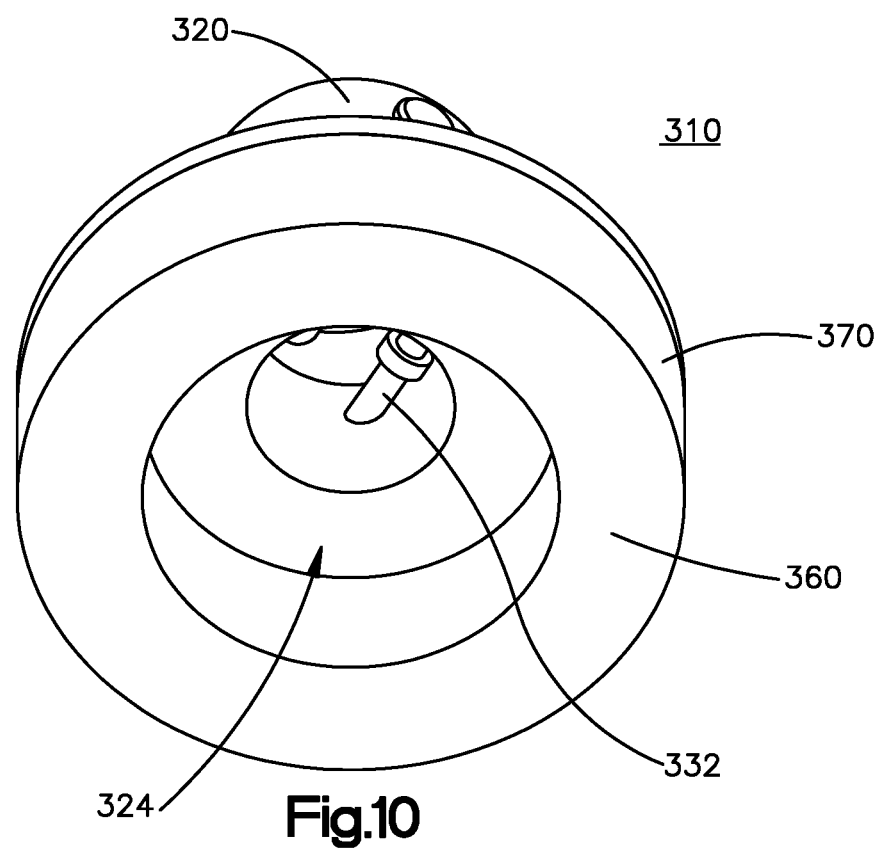
FIG. 10 is a bottom perspective view of a butterfly valve alternative to the spool valve and poppet valve.

FIGS. 10-12 illustrate a third embodiment valve assembly, a butterfly valve 310, that may be used in place of the spool valve assembly 110 described above. Butterfly valve assembly 310 includes a valve body 320, a moveable sleeve 330, and a suction cup 370. Valve body 320 may be affixed to base 30 of tool housing 20 by any appropriate, well-known means.

Valve body 320 includes a body sidewall 322 that has a butterfly assembly 340 within the passage 324 formed by sidewall 322. Butterfly assembly 340 includes a damper-like butterfly plate 342 mounted on or pivotable on a valve shaft 344 that bisects passage 324. An underside of one side of plate 342 includes a clevis or pivot 346. Valve shaft 344 may include a torsion spring 390 (called out by reference number but shown only schematically in FIG. 12) that biases plate 342 closed (clockwise in the figures) into its rest position as illustrated in the figures.

Sleeve 330 is moveable or slideable relative to fixed body sidewall 322, and includes a pin 332 extending from an interior surface of the sleeve sidewall. Preferably, the surface engagement between body sidewall 322 and sleeve 330 provides a seal 326 therebetween. Optionally, a seal, such as a conventional o-ring or elastomeric V-seal, may be provided therebetween. A link 380 is pivotally connected to pin 332 on its one end and pivotally connected to pivot 346 on its other end. A gap 364 is formed between a lower end of sidewall 322 and a flange 328 of sleeve 330 to provide space for the actuation (that is, translation of sleeve 330 upwardly) of the valve.

Suction cup 370 extends downwardly from flange 328. Suction cup 370 in the figures also functions to transmit the contact force applied to the object to actual butterfly valve 340, and in this regard a distal portion of suction cup 370 is labeled as contact surface 360. Thus, the compliance or resilience of suction cup 370 and its structure and materials may be chosen for optimizing engaging items for grasping and for force transmission.

Figure 13:
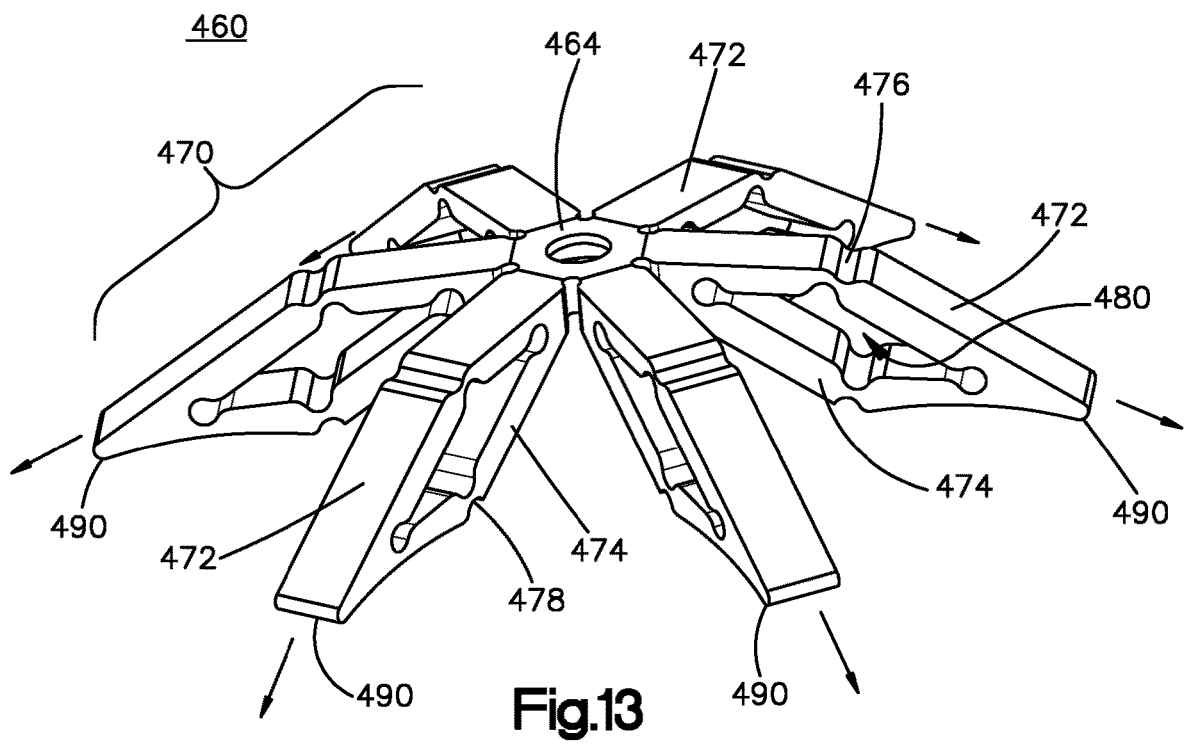
FIG. 13 is a perspective view of an alternative embodiment of a button component of the tool of FIG. 1.
Figure 14:
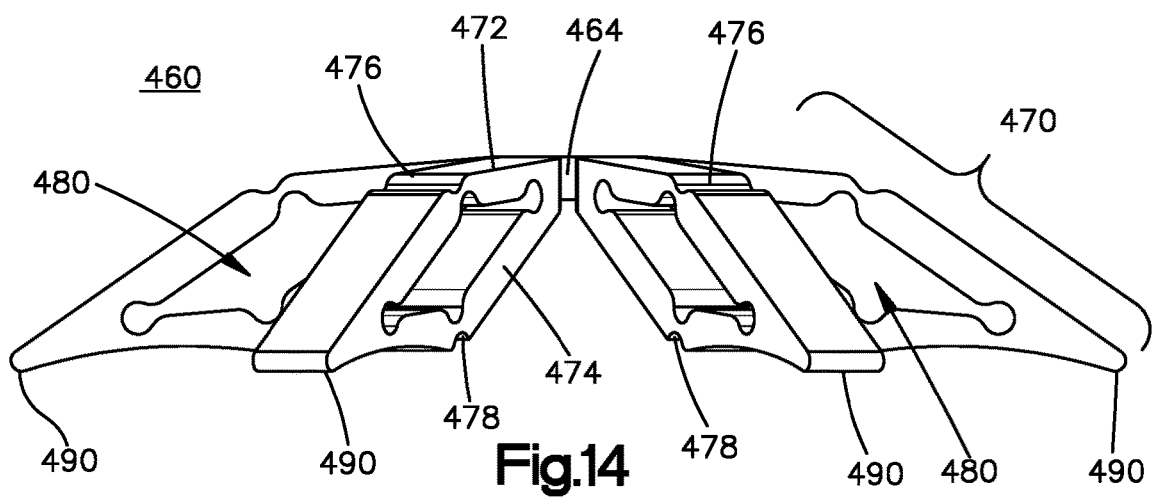
FIG. 14 is a side view of the button component of FIG. 13.

FIGS. 13 and 14 illustrate an alternative embodiment of a button 460 that may be used in place of buttons 160 and 260 described above. Button 460 has a center aperture for receiving a fastener (not shown) to attach button 460 to a valve shaft, such as piston shaft wall 132 or poppet shaft 234. The aperture is formed in a hub 464. Button 460 includes radially oriented fingers 470 that are attached to center hub 464.

Each finger 470 is oriented radially and extends downwardly, and includes an upper arm 472 and a lower arm 474 that each extend outwardly from hub 464 and are joined near the distal end for form a contact surface 490 on a distal underside of the finger. The space 480 between arms 472 and 474 is approximately rhombus-shaped to enhance deflection of the fingers. Each arm 472 and 474 may include a living hinge 476 and 478 formed by a thinned portion of the material of the arms to enhance flexibility and operation.

Upon contact of the contact surfaces 490 with an object, downward force applied to button 460 deflects the resilient fingers 470 such that downward movement after initial contact moves each finger radially outwardly, as indicated by the directional arrows in FIG. 13. The radially outward movement of contact surfaces 490 occurs as hub 464 moves downward after contact surfaces 490 contact the object and as the fingers elongate because of narrowing of the space 480 deforms. The radially outward movement of the contact surfaces 490 can provide a smoothing function when the tool engages the object, which can be beneficial (for merely a non-limiting example) when the tool engages a label. The figures illustrate fingers having identical length and shape. The present invention is not limited to the particular structure and function of button 460. For example, the button may have fingers having a different length, stiffness, moment of inertia, and/or geometry, depending on the desired functional parameters of the particular application. Further, pads may be attached to one or more of the fingers to enhance the performance of the button. The pads may be, for example, concave suction-cup like structures (similar to suction cups on the end of a tree frog fingers) and/or convex, slippery structures to enhance sliding or rolling contact while the concave type enhances gripping.

In operation, tool 10 can be moved by an arm into position to engage a target object to be grasped, in response to a control signal as described generally below. Before engagement with the object, the valve assembly 110 (or 210 or 310) is in its rest position such that plenum 40 has a vacuum or negative pressure while the spool (or seal plate or butterfly valve) blocks air flow (including pressure transmission) through the valve inlet 146 (or passages 222 or passage 324).

Upon engagement of tool 10 with an object, a downward force from the arm is transmitted through tool 10 such that button 160 (or 260 or contact surface 360) applies a contact force to the object, thereby enhancing contact and/or adhesion of the label before vacuum is fully applied to the item/label and/or preventing damage to the label. The force applied through button 160 (or 260 or contact surface 360) moves the piston assembly 130 (or poppet body 230 or sleeve 330) upwardly.

For first embodiment spool valve 110, upward movement of the piston shaft wall 132 actuates valve 110 to its open or actuated position by moving upper seal 140 above apertures 126 such that ports 136 are not blocked from apertures 126 by a seal, thereby exposing the passage 134 to vacuum pressure within the plenum 40. A directional arrow in FIG. 6 indicates the direction of the movement of the spool. As a result, air flows from inlet 146 though the valve 110 and into plenum 40 to create a suction at suction cup 170. Button 160 in the figures extends distally below suction cup 170 in the rest position such that button 160 contacts the object before the suction cup 170 engages the object, but such configuration is optional. After grasping and moving the object to a desired location, the vacuum pressure may be released in plenum 40 by conventional means to disengage suction cup 170 from the object. Spring 150 then returns valve 110 to its rest position.

For second embodiment valve poppet valve 210, upward movement of poppet body 230 actuates valve 210 to its open or actuated position by moving seal plate 232 upwardly and out of engagement of seals 224, thereby exposing the passages 222 to vacuum pressure in plenum 40. A directional arrow in FIG. 8 indicates the direction of the movement of the poppet body 230. As a result, air flows through passages 222 and into plenum 40 to create suction at suction cup 270. Button 260 in the figures extends distally below suction cup 270 in the rest position such that button 260 contacts the object before the suction cup 270 engages the object, but such configuration is optional. After grasping and moving the object to a desired location, the vacuum pressure may be released in plenum 40 by conventional means to disengage suction cup 270 from the object. Spring 250 then returns valve 210 to its rest position.

For third embodiment butterfly valve 310, upward movement of the sleeve 330 relative to body 320 moves link 380, which drives the plate 342 to pivot against the spring bias about shaft 344 to open the valve plate 342, thereby exposing passage 324 to vacuum pressure in plenum 40. A directional arrow in FIG. 11 indicates the direction of the movement of the butterfly plate 342. As a result, air flows through passage 324 and into plenum 40 to create suction at suction cup 370. After grasping and moving the object to a desired location, the vacuum pressure may be released in plenum 40 by conventional means to disengage suction cup 370 from the object. Spring 390 then returns valve 310 to its rest position.

Figure 15:
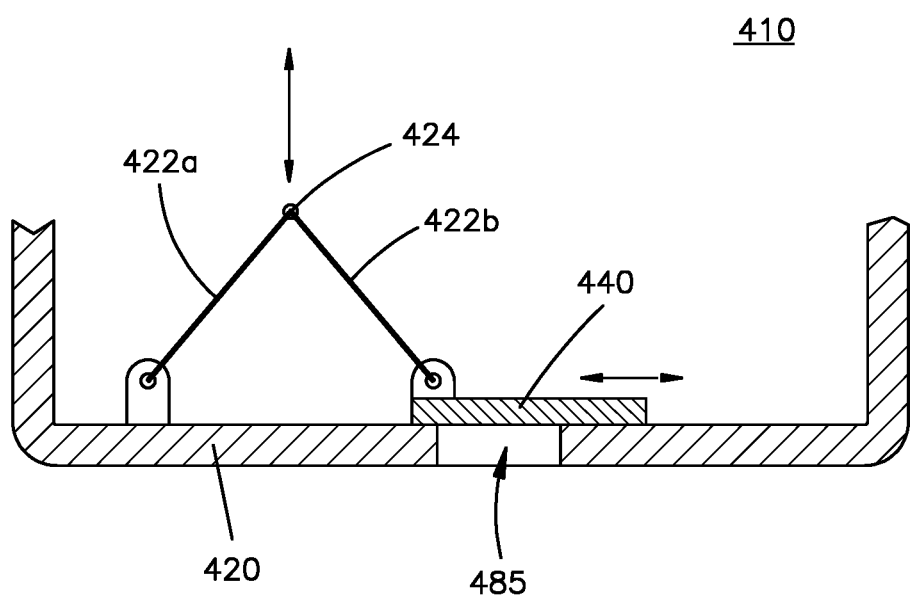
FIG. 15 is a schematic view of another valve embodiment.

FIG. 15 schematically illustrates a fourth embodiment valve assembly 410 that includes a body 420, a linkage 422, a slide plate 440 and an aperture 485. Linkage 422 includes links 422a and 422b that meet at a common point 424, which can be coupled to a linkage (not shown) that engages an item with a contact force to actuate valve 410. Upon upward movement of point 424, links 422a and 422b are drawn together, which provides a lateral (horizontal as oriented in FIG. 15) force to the left on slide plate 440, which moves uncovers aperture 485 to enables air to be drawn upwardly through aperture 485 due to the vacuum pressure above plate 440 within body 420. Downward movement of point 424 is transmitted through links 422a and 422b to drive plate 442 rightward (as oriented in FIG. 15) to cover aperture 485 to isolate the region below aperture 485 from the vacuum pressure.

In this regard, valve assembly 410 can be actuated by a vertical movement of a portion of the linkage, and the actuation includes a lateral movement of a portion of the linkage as part of the function of opening and closing the valve. Plate 440 can includes guides to maintain its position relative to body 420, seals (not shown in the figures) to inhibit air flow around plate 420 while in the closed position, and a spring or other biasing means to bias plate 440 towards its closed position.

The position and orientation of the end effector may be controlled through instructions from the control system. Specifically, the control system may receive input from a human operator and/or a grasp planning program so as to employ custom grasping strategies for various shapes of items. For example, in relation to suction-type end effectors, six-sided boxes with planar surfaces and no label may require only simple grasping strategies regardless of size and orientation. But items with more complex surfaces may be difficult to grasp, especially if these items are disposed in close proximity to other items and objects, such as when multiple items are disposed in a storage container such as a gaylord.

In some embodiments, the control system may receive data from one or more sensors (for example, optical, contact, proximity, etc.) disposed on and/or around the end effector. This data will be used by the control system to determine surface shapes of the item and objects near the item. Alternatively, or additionally, the control system may receive data from a database of known item types. For example, data of known item types may describe the item using two or higher dimensional images and/or modes of the item, attributes of the item (e.g., dimensions, weights, center of gravity, etc.), and/or features associated with surfaces of the item (e.g., a surface label, surface or material characteristics, etc.). A two dimensional image of the item showing a feature may allow an identification of a respective surface. If the two dimensional image (or a plurality thereof) shows multiple features, relative distances, positions, and orientations of these features may be determined. Generated two dimensional images of an item may be mapped to a multi-dimensional model that enables the control system to determine the relative position and orientation of the item in three-dimensional space. Alternatively, or additionally, the control system may receive data from one or more sensors (for example, optical, contact, proximity, etc.) in a scan tunnel disposed upstream of the end effector.

Alternatively, or additionally, the control system may receive data indicating grasping strategies that have been successful or unsuccessful for the same or similar items and/or item configurations in the past. Success data may be based on a specific end effector and/or a specific type of end effector and/or data related to the position and orientation of the end effector in relation to the items and item configurations. For example, the control system for the end effector may receive success data from the end effector itself, as well as other end effectors with the same or similar design. The known item data may also describe the applied manipulations (e.g., a list of the actions including grasping, moving, retrieving, etc.), related manipulation parameters (e.g., type and amount of force, pressure, voltage, and/or current applied, orientation of an item, etc.), and successes and failures of the applied manipulations (e.g., whether grasping an item was successful, damages resulting from using particular manipulations, end effectors, or forces, etc.).

The control system may receive input from a human and/or from one or more sensors regarding which, of two successful grasping strategies, is a better grasp. The control system may employ other data inputs, as well. The control system may employ machine learning on the received data to determine an initial grasping strategy. If unsuccessful, the control system may provide a second grasping strategy based, at least in part, on the data that the initial grasping strategy was unsuccessful. Once a successful grasping strategy is determined, the control system will save to the database data related to the successful strategy for future use by the specific end effector and other end effectors grasping the same or similarly shaped items.

In some embodiments, the robotic manipulation system is able to employ other end effectors having different structural profiles if the first grasping strategy using the first end effector is unsuccessful. The control system can receive success data regarding multiple end effectors, including input from a human and/or from one or more sensors (for example, optical, contact, proximity, etc.) regarding which, of two successful grasping strategies, is a better grasp. The control system will save to the database data related to strategies for grasping when multiple end effectors are available for future use by the specific end effector and other end effectors grasping the same or similarly shaped items.

Data used and gathered by the control system may be exchanged over one or more networks. The networks may include a public data network (e.g., the Internet) and a private data network (e.g., an intranet or a virtual private network (VPN)), wireless or wired, and implementing different communication protocols (e.g., TCP/IP). The network may connect to the specific robotic arm on which the end effector is disposed, as well as other robotic arms.

The EOAT structure and function are described herein by referring to advantages and specific examples or embodiments. The present invention is not limited to the advantages explained herein, nor to the structure or function of the examples or embodiments. For merely one example, the problem of inadvertent removal of labels or deformation of films during handling is explained, and the application of the button can improve the function cups in this regard. However, the structure and function of the present invention is not limited to addressing the label or resilient film issues. Moreover, the text is intended to describe the specific embodiments shown in the figures. The structure and function shown and described is intended only for example. For non-limiting examples, the location and types of seals, the location of corresponding parts and their movements, and the function descriptions are not intended to limit the scope of the invention. Rather, it is intended that the invention be given the full scope of the plain meaning of the claims.

What is claimed:

1. A spool valve assembly, comprising:
    a housing defining apertures;
    a spool assembly at least partly within and moveable within the housing, the spool assembly including:
        a hollow piston including a shaft wall defining ports formed therethrough, the hollow piston being biased to a rest position;
        a seal formed between the piston shaft wall and the housing when the hollow piston is in the rest position, the seal configured to block air flow between the housing apertures and the shaft wall ports; and
        a button forming a bottom face of the housing; and
    a suction cup having a sidewall positioned circumferentially around the button,
    wherein the hollow piston is configured to be displaceable, against the bias, in response to a force applied through the button, thereby enabling air flow between the housing apertures and the shaft wall ports.

2. The spool valve assembly of claim 1, wherein:
    the seal is an upper seal,
    the spool valve assembly further comprises a lower seal formed on the piston shaft wall, and
    when the hollow piston is in the rest position, the lower seal is located below the shaft wall ports and the upper seal is located above the shaft wall ports.

3. The spool valve assembly of claim 1, further comprising a spring that biases the hollow piston toward the rest position.

4. The spool valve assembly of claim 3, wherein the housing includes a top plate, the spring engaging the top plate.

5. The spool valve assembly of claim 2, wherein the shaft wall further defines lower apertures that are located below the lower seal.

6. The spool valve assembly of claim 1, wherein the suction cup is at least one of a bellows or a vacuum cup.

7. The spool valve assembly of claim 1, wherein the button has a planar contact face.

8. The spool valve assembly of claim 7, wherein the button includes oriented fingers that are configured to, in response to the force applied through the button upon engagement with a planar label of a package, move radially outwardly over the planar label.

9. A tool configured to engage an object, the tool comprising:
    a housing defining a plenum and a vacuum inlet configured to provide vacuum to the plenum;
    a valve assembly including an inlet open to ambient air, an outlet in fluid communication with the plenum, an actuator, and a valve that is biased toward a rest position in which the valve blocks air flow between the inlet and the outlet; and
    a suction cup having a sidewall positioned circumferentially around the valve inlet, the suction cup mounted to at least one of the housing or the valve assembly,
    wherein the actuator is configured to be displaceable relative to housing, against the bias and in response to the valve assembly engaging an object, thereby enabling air flow between the inlet and the outlet, and
    wherein the tool is configured to apply a force to an item and/or label of a package, upon engagement of the tool with the package, before application of vacuum pressure through the suction cup.

10. The tool of claim 9, wherein the actuator comprises a spring configured to bias the valve toward the rest position.

11. The tool of claim 9, wherein the valve assembly is a poppet valve, the poppet valve including:
    a body, wherein the inlet and the outlet are formed in the body;
    a seal plate that, when the poppet valve is in the rest position seals the outlet to block air flow;
    a poppet shaft coupled to the seal plate;
    a button coupled to the poppet shaft opposite the seal plate; and
    a spring configured to bias the seal plate toward a closed position.

12. The tool of claim 9, wherein the valve assembly is a butterfly valve assembly, the butterfly valve including:
    a valve body;
    a pivotable plate in the valve body that is closed when the butterfly valve is in the rest position;
    a sleeve that is moveable relative to the valve body; and
    a link coupled between the sleeve and the pivotable plate, whereby movement between the sleeve and valve body actuates the pivotable plate.

13. The tool of claim 12, wherein the actuator is the sleeve, the outlet is formed by the valve body, and the inlet is formed by the sleeve.

14. The tool of claim 10, further comprising a second valve assembly, the valve assembly having a spring force and/or force profile that is different than a spring force and/or force profile of the second valve assembly.

15. A spool valve assembly, comprising:
    a housing defining apertures;
    a spool assembly at least partly within and moveable within the housing, the spool assembly including:
        a hollow piston including a shaft wall defining ports formed therethrough, the hollow piston being biased to a rest position;
        at least one seal formed between the piston shaft wall and the housing when the hollow piston is in the rest position, the at least one seal configured to block air flow between the housing apertures and the shaft wall ports; and
        a button having a planar bottom contact face; and
    a suction cup positioned about the button,
    wherein the hollow piston is configured to be displaceable, against the bias, in response to a force applied through the button, thereby enabling air flow between the housing apertures and the shaft wall ports, and
    wherein the button includes oriented fingers that are configured to, in response to the force applied through the button upon engagement with a package, move radially outwardly over the package.

16. The spool valve assembly of claim 1, wherein the sidewall of the suction cup circumferentially surrounds an entirety of a perimeter of the button.

17. The spool valve assembly of claim 1, wherein displacement of the hollow piston aligns the sleeve housing apertures and the shaft wall ports, thereby enabling air flow between the sleeve housing apertures and the shaft wall ports.

18. The spool valve assembly of claim 1, wherein the seal is an o-ring.

19. The spool valve assembly of claim 1, wherein the suction cup and the hollow piston are concentric.

20. The tool of claim 9, wherein the sidewall of the suction cup circumferentially surrounds an entirety of a perimeter of the valve inlet.

\* \* \* \* \*